United States Patent [19]

Niedecker

[11] 4,419,790
[45] Dec. 13, 1983

[54] FILLING TUBE FOR FILLING TUBULAR CASINGS WITH PASTY MATERIAL

[76] Inventor: Herbert Niedecker, Am Ellerhang 8, D 6140 Königstein 2, Fed. Rep. of Germany

[21] Appl. No.: 404,803

[22] Filed: Aug. 3, 1982

Related U.S. Application Data

[63] Continuation of Ser. No. 213,784, Dec. 8, 1980, abandoned.

[30] Foreign Application Priority Data

Dec. 15, 1979 [DE] Fed. Rep. of Germany ....... 2950590

[51] Int. Cl.$^3$ ............................................. A22C 11/04
[52] U.S. Cl. .......................................... 17/35; 53/285; 141/250
[58] Field of Search ............... 17/35, 41; 53/551, 285; 141/141, 250, 255, 264, 284, 313, 314, 315, 316, 317, 392, 10; 222/80, 522, 525, 529, 531

[56] References Cited

U.S. PATENT DOCUMENTS

| | | | |
|---|---|---|---|
| 2,553,264 | 5/1951 | Lycke | 222/80 X |
| 3,010,144 | 11/1961 | Kochjohann | 17/41 X |
| 3,659,317 | 5/1972 | Kupcikevicius | 17/41 X |
| 3,756,290 | 9/1973 | Cleland | 141/114 |

FOREIGN PATENT DOCUMENTS 1057908 of 0000 Fed. Rep. of Germany.
2114903 of 0000 Fed. Rep. of Germany.
2402361 of 0000 Fed. Rep. of Germany.
2437562 of 0000 Fed. Rep. of Germany.
2649249 of 0000 Fed. Rep. of Germany.
2828337 of 0000 Fed. Rep. of Germany.
2950590 6/1981 Fed. Rep. of Germany ......... 17/35

*Primary Examiner*—Stephen Marcus
*Assistant Examiner*—Mark Thronson
*Attorney, Agent, or Firm*—Sprung, Horn, Kramer & Woods

[57] ABSTRACT

A filling apparatus for filling tubular casings with pasty material, comprising a filling tube provided with a discharge opening 6, a cover- or lidlike closure member 5 which is mounted in front of the discharge opening of the filling tube, means for moving the closure member between a first position in which it closes the filling tube discharge opening and a second open position in which it permits discharge of the material to be packaged, web means 8, 20 connecting the closure member to the filling tube in such a manner that the material to be packaged is radially deflected into the casing between the discharge end and the closure member, a shell tube 12 surrounding the filling tube and having its forward edge formed as a knife edge 13, and means 14 for axially displacing the shell tube in the filling direction so that in its final position the shell tube constitutes a peripherally extending closure for the discharge openings of the filling tube.

2 Claims, 7 Drawing Figures

FILLING TUBE FOR FILLING TUBULAR CASINGS WITH PASTY MATERIAL

This is a continuation of application Ser. No. 213,784, filed Dec. 8, 1980, now abandoned.

This invention relates to a filling tube for filling tubular casings with pasty material, comprising a cover- or lidlike closure member, which is mounted in front of the discharge opening of the filling tube and when open permits a discharge of the material to be packaged, and a shell tube for closing the discharge opening.

In known apparatus for filling tubular casings with pasty material, the discharge opening of the filling tube is closed with a closure member, which is actuated by means of a connecting rod, which extends through the filling tube (German Early Disclosure 24 02 361). This has the disadvantage that the free cross-sectional area of the filling tube is correspondingly decreased and the areas with which the pasty material is in frictional contact are correspondingly increased.

In accordance with German Early Disclosure 24 37 562 and German Early Disclosure 21 14 903, the closure member has a knife edge for cutting lump material to be packaged. In those apparatus, the material to be packaged is initially squeezed and is cut through only in the final position of the knife edge. As a result, unilateral forces are exerted on the connecting rod so that its centered guidance is no longer ensured.

German Early Disclosure 26 49 249 and German Early Disclosure 28 28 337 disclose a filling tube which is partly closed at its end so that the discharge opening is smaller than one-half of the free cross-sectional area of the filling tube. The opening is closed by a rotation of the shell tube, which is mounted on the filling tube.

It is an object of the invention to provide a filling tube of the kind described first hereinbefore with a closing mechanism which permits the entire free cross-sectional area of the filling tube to be utilized for a gentle discharge of the material to be packaged, even when it contains lumps of meat. Besides, the element for closing the discharge end of the filling tube should be actuated from the outside so that filling tubes arranged in a turret can be used too. Moreover, any lumps of meat which are incorporated in the pasty material and are disposed in the discharge opening during the filling operation should be satisfactorily cut through so that the free end of the closed casing is free from packaged material.

This object is accomplished in accordance with the invention in that the closure member is rigidly connected to the filling tube by connecting webs in such a manner that the material to be packaged is radially deflected into the casing between the discharge end and the closure member and that the shell tube mounted on the filling tube is axially displaceable in the filling direction and in its final position constitutes a peripherally extending closure for the discharge openings of the filling tube, and that the end edge of the shell tube constitutes a knife edge. The cutting action will be improved if the shell tube can be helically moved to its final position. The closure member constitutes preferably a valve poppet; this will promote fluid flow.

The filling tube according to the invention affords the advantage that the material to be packaged is radially discharged through the discharge opening so that the entire free cross-sectional area of the filling tube is available for the discharge of the material to be packaged. Besides, any meat lumps or tendons which may be disposed in the discharge opening when the wrapper has been filled can be cut through satisfactorily. This will prevent a retention of perishable meat residues in the free end portion of the closed wrapper. The proposed design of the discharge opening promotes fluid flow and reduces the friction as the wrapper is filled, and improves the visual appearance of the meat. Besides, the provision of an external drive connected to the shell tube permits the use of the filling tube according to the invention with turretlike arrays of a plurality of such tubes.

The apparatus according to the invention will now be described with reference to the drawings, which show embodiments of the invention.

Figure 1:
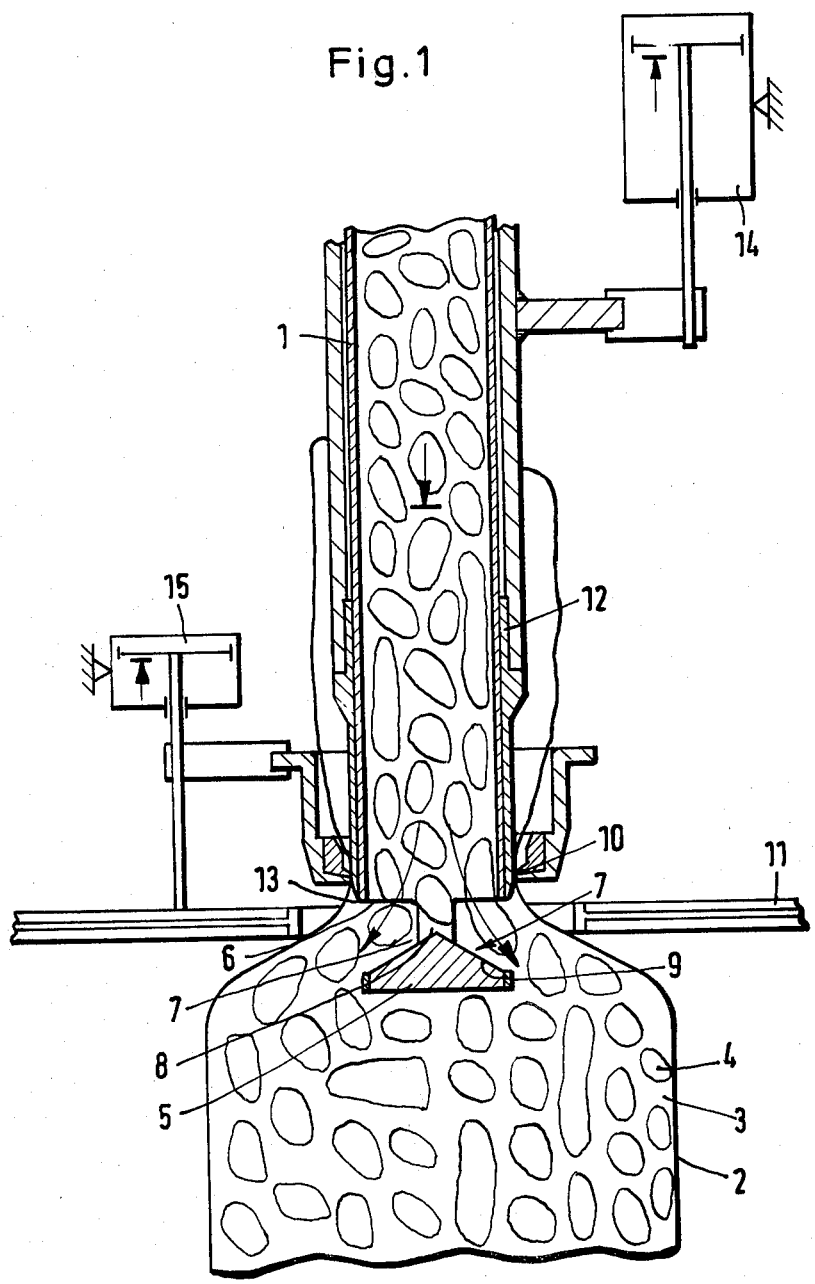
FIG. 1 is a sectional view showing the apparatus with the shell tube in its initial position.

FIG. 1 shows the end portion of the filling tube 1 of a filling machine, not shown, during the filling of a tubular casing 2 with pasty material 3, which in this case contains large lumps of meat 4. A conical closure member 5 is mounted at the discharge end 6 of the filing tube 1 in such a manner that discharge openings for material 3 to be packaged are provided between the discharge end 6 and the closure member 5. The closure member 5 is connected to the filling tube 1 by webs 8. The cone 9 of the closure member 5 is designed to deflect to a radial direction the pasty material 3 flowing out of the filling tube 1.

During the filling operation, the tubular casing 2 is snubbed by a casing snubber 10 and the squeezing means 11 are sufficiently retracted so that the material to be packaged can be discharged freely.

Figure 2:
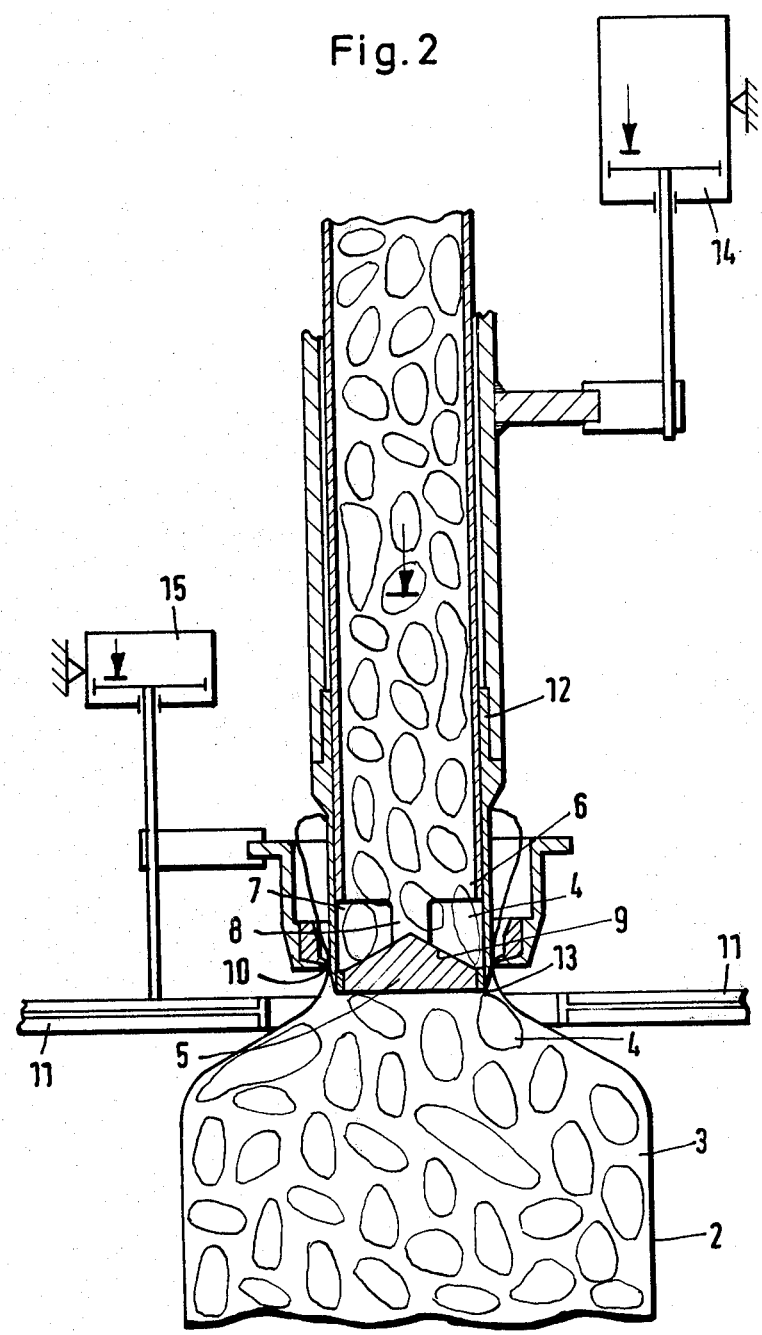
FIG. 2 is a sectional view showing the apparatus with the shell tube in its final position.

The shell tube 12 is axially slidably mounted on the filling tube 1. The axial movement may be combined with a rotational movement. The end edge of the shell tube 12 consists of a knife edge 13. When the filling operation has been completed, a drive 14 is operated by which the shelltube 12 is axially displaced to close the discharge opening 7 (FIG. 2). Lump material 4 to be packaged is severed by the knife edge 13 cooperating with the closure member 5. The casing snubber 10 and the squeezing shears 11 are advanced in the filling direction by another drive 15.

FIG. 2 shows the shell tube 12, which in its final position closes the discharge opening 7. The lump of meat 4 has been severed by the knife edge 13 of the shell tube 12.

Figure 3:
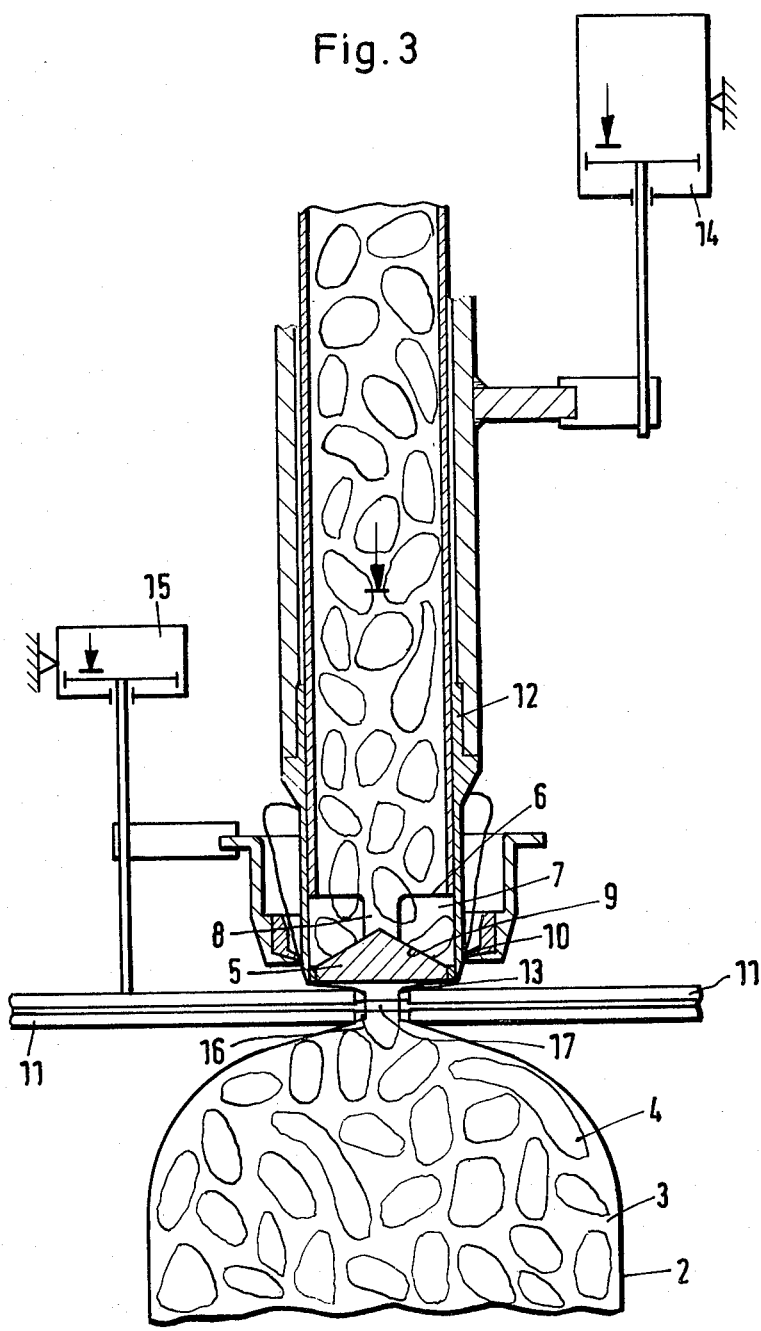
FIG. 3 is a sectional view which is similar to FIG. 2 but shows the apparatus during the closing operation.

FIG. 3 shows the shell tube 12 of FIG. 2 in its final position with the squeezing shears 11 closed to compress the casing 2 and form it with a free end 16, which is subsequently closed with a clip 17. Then the drive 14 returns the shell tube 12 to its initial position.

Figure 4A:
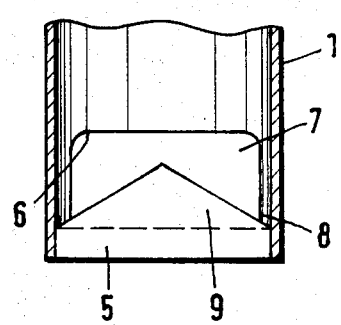
FIGS. 4a and 4b are two sectional views showing the filling tube end portion and the closure member of the apparatus shown in FIGS. 1 to 3.
Figure 4B:
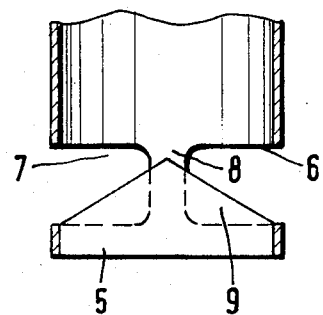
Figure 5A:
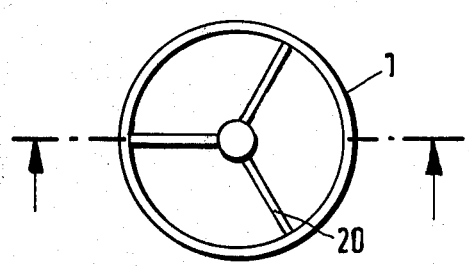
FIGS. 5a and 5b are an elevation and a sectional view showing another embodiment of the closure member of the apparatus according to FIGS. 1 to 3.
Figure 5B:
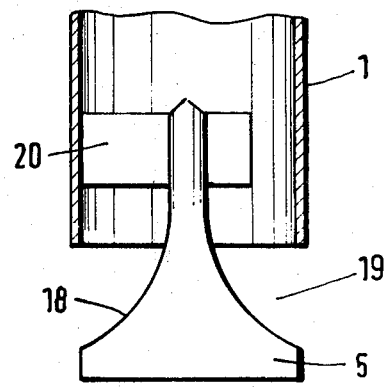

FIGS. 4a and 4b are sectional views showing the discharge end 6 with the closure member 5 and discharge opening 7 of FIGS. 1 to 3. FIGS. 5a and 5b show another embodiment of the closure element 5. In this case the closure member 5 of the filling tube 1 comprises a valve poppet 18 in order to improve the flow conditions for the deflection of the outflowing material 3 to a radial direction. There are no connecting webs 8 in this embodiment so that the material 3 to be packaged can emerge throughout the periphery 19 of the tube. The closure member 18 consisting of a valve poppet is connected to the filling tube 1, e.g., by three connecting webs 20.

FIG. 4a is offset 90° relative to FIG. 4b.

It will be appreciated that the instant specification and examples are set forth by way of illustration and not limitation, and that various modifications and changes may be made without departing from the spirit and scope of the present invention.

I claim:

1. A filling apparatus for filling tubular casings with pasty material, comprising a hollow filling tube provided with a discharge opening, a cover or lidlike closure member mounted in front of the discharge opening of the filling tube, means for moving the closure member between a first position in which it closes the filling tube discharge opening and a second open position in which it permits discharge of the material to be packaged, web means for connecting the closure member to the filling tube peripherally in such a manner that the material to be packaged is radially deflected into the casing between the discharge end and the closure member, a shell tube surrounding the filling tube and having its forward edge formed as a knife edge, a snubber about the shell tube for snubbing a casing during filling, means for axially displacing the shell tube relative to the filling tube in the filling direction so that in arriving in its final position the shell tube knife edge cuts any material projecting radially beyond the filling tube and the shell tube constitutes a peripherally extending closure for the discharge openings of the filling tube, and means for closing the casing after the shell tube arrives in its final position.

2. A filling apparatus according to claim 1, wherein the means for axially displacing the shell tube also rotates the shell tube so that the shell tube is helically moved to its final position.

* * * * *